United States Patent
Revheim

(10) Patent No.: US 12,393,173 B2
(45) Date of Patent: Aug. 19, 2025

(54) METHOD FOR PLANNING AND EXECUTING REAL TIME AUTOMATED DECISION SUPPORT IN OIL AND GAS WELLS

(71) Applicant: Exebenus AS, Sandnes (NO)

(72) Inventor: Olav Revheim, Søgne (NO)

(73) Assignee: Exebenus AS, Sandnes (NO)

( * ) Notice: Subject to any disclaimer, the term of this patent is extended or adjusted under 35 U.S.C. 154(b) by 0 days.

(21) Appl. No.: 15/066,282

(22) Filed: Mar. 10, 2016

(65) Prior Publication Data

US 2017/0212505 A1 Jul. 27, 2017

(30) Foreign Application Priority Data

Jan. 26, 2016 (NO) .............................. NO 20160120

(51) Int. Cl.
*G05B 19/4155* (2006.01)
*E21B 44/00* (2006.01)
*G05B 17/02* (2006.01)

(52) U.S. Cl.
CPC .......... *G05B 19/4155* (2013.01); *E21B 44/00* (2013.01); *G05B 17/02* (2013.01); *G05B 2219/45129* (2013.01)

(58) Field of Classification Search
CPC .......... G05B 2219/45129; G05B 15/02; G05B 19/4155; E21B 44/02; E21B 44/06
USPC ........................ 700/29, 31, 108, 174; 703/10
See application file for complete search history.

(56) References Cited

U.S. PATENT DOCUMENTS

| | | | |
|---|---|---|---|
| 8,684,108 B2 * | 4/2014 | Turner | G05B 13/048 |
| | | | 175/24 |
| 9,085,958 B2 | 7/2015 | Laing et al. | |
| 9,249,654 B2 * | 2/2016 | Strachan | E21B 44/00 |
| 9,354,353 B2 * | 5/2016 | Celepcikay | G01V 3/38 |
| 9,598,947 B2 * | 3/2017 | Wang | E21B 44/00 |
| 10,167,719 B2 * | 1/2019 | Ezzat | G01N 15/0826 |
| 10,233,727 B2 * | 3/2019 | Conn | E21B 43/16 |
| 10,370,940 B2 * | 8/2019 | Ranjan | F16L 21/005 |
| 10,580,532 B2 * | 3/2020 | Hämäläinen | A61B 5/02405 |
| 2005/0252286 A1 * | 11/2005 | Ibrahim | G01N 33/2823 |
| | | | 73/152.55 |
| 2007/0289740 A1 * | 12/2007 | Thigpen | E21B 43/00 |
| | | | 166/250.01 |
| 2007/0294034 A1 * | 12/2007 | Bratton | E21B 41/00 |
| | | | 702/6 |

(Continued)

FOREIGN PATENT DOCUMENTS

WO WO-2013006165 A1 1/2013

*Primary Examiner* — Hsien Ming Lee

(74) *Attorney, Agent, or Firm* — Casimir Jones, S.C.; Thomas J. Lyneis

(57) ABSTRACT

Method for controlling the state of an operation in a hydrocarbon exploration and recovery environment, including creating at least one function model, said function model including at least one function, executing at least one function within said function model, defining a plurality of function controls, a pre-determined combination of given function controls within said plurality of function controls defining a signature event, an occurrence of said signature event being indicative of a specific state of said operation, and monitoring the occurrence of said signature event during execution of a certain function included in said at least one function model.

4 Claims, 13 Drawing Sheets

(56) References Cited

U.S. PATENT DOCUMENTS

| | | | | |
|---|---|---|---|---|
| 2012/0130693 A1* | 5/2012 | Ertas | ............. | E21B 44/00 |
| | | | | 703/2 |
| 2013/0206477 A1 | 8/2013 | Boone | | |
| 2013/0292178 A1* | 11/2013 | Burress | ............. | E21B 7/00 |
| | | | | 175/50 |
| 2014/0043938 A1* | 2/2014 | Sinha | ............. | G01V 1/50 |
| | | | | 367/31 |
| 2014/0172306 A1* | 6/2014 | Brannigan | ............. | E21B 47/00 |
| | | | | 702/13 |
| 2015/0039234 A1* | 2/2015 | Abou-Sayed | ............. | G01V 99/00 |
| | | | | 702/11 |
| 2015/0247396 A1* | 9/2015 | Tunc | ............. | E21B 44/02 |
| | | | | 700/275 |

\* cited by examiner

METHOD FOR PLANNING AND EXECUTING REAL TIME AUTOMATED DECISION SUPPORT IN OIL AND GAS WELLS

BACKGROUND OF THE INVENTION

The present invention generally relates to the operation of pipes, tubulars and tools in oil and gas wells.

Drilling and well operations in wells for the oil and gas industry involves complex and expensive operations. A large manpower is typically used to manage and controls these operations. Despite all efforts, due to the complexity of the operations, a percentage of the operations fail, and are classified as "downtime". Such downtime costs, each of the major oil companies, large sums (typically greater than a billion USD) each year. Research and operational benchmarking show that automated decision support and automated operations provide a consistently higher quality performance than can be achieved by manual operations. Root-cause analyses also show that a large portion of the downtime is caused due to human errors, typically a result of poor planning, erroneous use of equipment, incorrect situational awareness or other similar factors. In addition, automated operations and operations supported by automated decision proposals result in improved HSE (Health Safety Environment) records due to improved regularity of operations, and by managing operations off-site and thereby not being exposed to the hazards at a well site.

A majority of the most complex operations involved in drilling, completions, well interventions, workovers and plugging of wells still rely on human interpretation of written work procedures, commonly referenced as "well procedures", "programs", "operations procedures" or similar. For the sake of simplicity and without loss of generality, in the present disclosure, the term well procedure will be used as a synonym for all such related terms describing the written work procedure for well operations.

The most common method currently used for preparing such procedures is that the owner of the well objects, typically a service company, prepares text that is submitted to the owner of the well, or their representative, which in turn assembles a well procedure based on input from one or more well object owners. This assembled well procedure is then submitted as a text to the well site, where technical specialists manually interpret the data from the well. The current process, thus involves three main manual operations, all with a relatively large error margin and potential for undesired consequences; first, the manual process of preparing a procedure by the well object owner, second, the manual process of preparing a well procedure by the well owner, and third, the human interpretation of the well procedure by the specialists at the well site.

Patent publication US 2013/0206477 A1 proposes a well prognosis system and method. The system and method proposed in said publication is based on a project plan execution system, an action item development engine, and a sensor engine. Said engines analyze and control a well drilling operation in accordance with the specification set forth in the prognosis.

The problems highlighted above and other limitations of the prior-art will be shown solved by the features of the present invention as taught in the following independent claims.

SUMMARY OF THE INVENTION

For the sake of simplicity, and without any loss of generality, the present disclosure uses term "well environment" to explain the features of the invention. The use of this term and the application of the present invention should be considered in its widest sense to encompass application in any operation in a hydrocarbon exploration or recovery environment.

Furthermore, for the sake of simplicity, the term "well object" is used to refer to any object that is a part of said hydrocarbon exploration or recovery environment. Without any loss of generality, the term well object should also include any tubular, pipe, tool or other objects that are purposely deployed in a well, for example, by a conveyance unit, exemplified by as a drilling rig, wireline unit or similar. Such tubulars, pipes and tools may include any object used in well operations including, but not limited to drilling, running casing and liners, open hole and top completions, gravel packing or other sand control operations, perforating, zonal isolation and plugging, side-tracking well clean-up, well testing, plugging and abandonment, well interventions, and their likes. Furthermore, the hole itself, the drilling mud or other fluid present in the well, such as oil and gas, completion fluid, cement or other, as well as the individual rock layers penetrated by the well, can be considered well objects in the method described in the invention. The terms such as "well object" are, hence, used for the sake of simplicity and without any loss of generality of the present invention.

The present invention proposes a new method for operation of pipes and tools in a process site such as a well, wherein the operations procedure is automatically generated, shared and related to the data stream from the process site. The present invention is, thus, able to essentially eliminate the error prone manual processes that are currently used for generating the operation and control procedures, such as well procedures. By using automatically generated well procedures in planning, quality assurance and/or well operations and operational analysis, the present invention essentially removes the reliance on human preparation, guesswork, and subjective interpretation of the well procedures. The present invention further removes or strongly reduces the need for human validation and quality assurance of well plans and well operations alike, thus removing or greatly reducing the downtime resulting from human errors.

The present invention also describes a method for assigning technical data and functions to a well object. The invention further describes the application of function controls to said functions, and how said functions can be used for generating a well procedure, when the invention is applied to operations for an oil well. The present invention further describes in another embodiment how said function controls can be combined to create event signatures. Again taking the example of application related to an oil well, in the preferred embodiment, said event signatures are coupled to a real time data stream from the well operation related to said well object, and said event signatures are used for identifying events executed in the well. In yet another embodiment, when said event signatures are combined with pre-determined performance boundaries or a safe operating window for an event, the system utilizing the present invention is able to issue alarms when a violation of the safe operating window occurs during said event. In a further embodiment, the present invention describes the recognition of events by analyzing their signature in the process environment such as a well. This can provide information to professionals, including, that a particular event has initiated, said event is progressing normally, and that said event has concluded. By monitoring and recognizing pre-determined events according to the present invention, the system is able to determine that a particular function has been carried out in a successful manner. The present invention is further able to determine if a particular function has encountered any problems or has been unsuccessful. Thus in its preferred embodiment, the present invention is able to provide an automated decision support for the well operations. In the case of an unsuccessful function or event, another preferred embodiment of the present invention describes a method for recommending corrective well procedures.

In another embodiment, the present invention also proposes a method for operating or controlling equipment used for manipulating said one or more well objects. A specific example of said equipment, used here to explain the present invention, is bottom hole assembly ("BHA"). For the sake of simplicity, and without any loss of generality, the present disclosure uses the term "BHA" to explain the features of the invention related to control, operation, or manipulation of equipment used in said well environment. The use of this term and the application of the present invention should be considered in its widest sense to encompass application in any tool, machine, or equipment in a hydrocarbon exploration or recovery environment.

In another embodiment, at least some of said equipment are defined using a combination of a plurality of well objects.

In yet another embodiment, a method for combining well objects into a bottom hole assembly ("BHA") model and a BHA function model is described. It is further described how these models can be applied in a well model for operational planning, thus providing a quality control all operations expected to be carried out in a well operation for a specific BHA. In another embodiment, a method for applying the models and methods in a consistent process for carrying out well operations using a BHA is described. For the sake of simplicity, each step of the method is described in a generic way, as individual embodiments, and exemplified by using well objects used in well operations. As a person skilled in the art will appreciate, the proposed method may apply for any well object.

The present invention will now be described in detail below with reference to accompanying drawings, illustrating the invention by way of examples.

Each well object used in said hydrocarbon exploration or recovery environment will typically have a set of associated engineering parameters related to both the physical and performance characteristics of the object. Such parameters are generally termed technical data in this disclosure. The technical data for a tubular includes, amongst others, data such as outer and inner diameter, weight, displacement, tensile and torsional strength as well as burst and collapse pressure. Examples of technical data for a rock may include compressional strength, pore pressure, fracture pressure, lithology and other relevant parameters. Some of these technical data may be dynamic, such as the hydrostatic pressure and rheology properties of fluids, and the described methods allow the use of derived and/or modelled technical data.

Furthermore, some well objects may also be associated with functions describing operations and actions performed in order to operate the well object in a well. Said functions being understood in computational sense, and said functions running on a computational unit. Each such function is generally defined in this disclosure as an attribute to a well object. Each well object may have any integer number, from 0 and onwards, of associated functions. The functions describe the operations required to operate, control, or manipulate the associated well object. Said functions may, for example, be any standard operations performed at the surface to operate a well object conveyed into a well. Some most common such operations include, vertical movement of the pipe, tubular, wire or similar used to convey the well object into the well, rotation or applied torque, pressure or circulation through the pipe, or annuli between pipes, or in hydraulic control lines, or electric or electronic signals via the pipe, tubular, wire or an umbilical or any combination of the above listed functions. The operations associated with said functions are routinely used to describe well operations in a well procedure, but in this disclosure, the functions are proposed as attributes to the well objects, rather than part of a well procedure.

DETAILED DESCRIPTION

Figure 1:
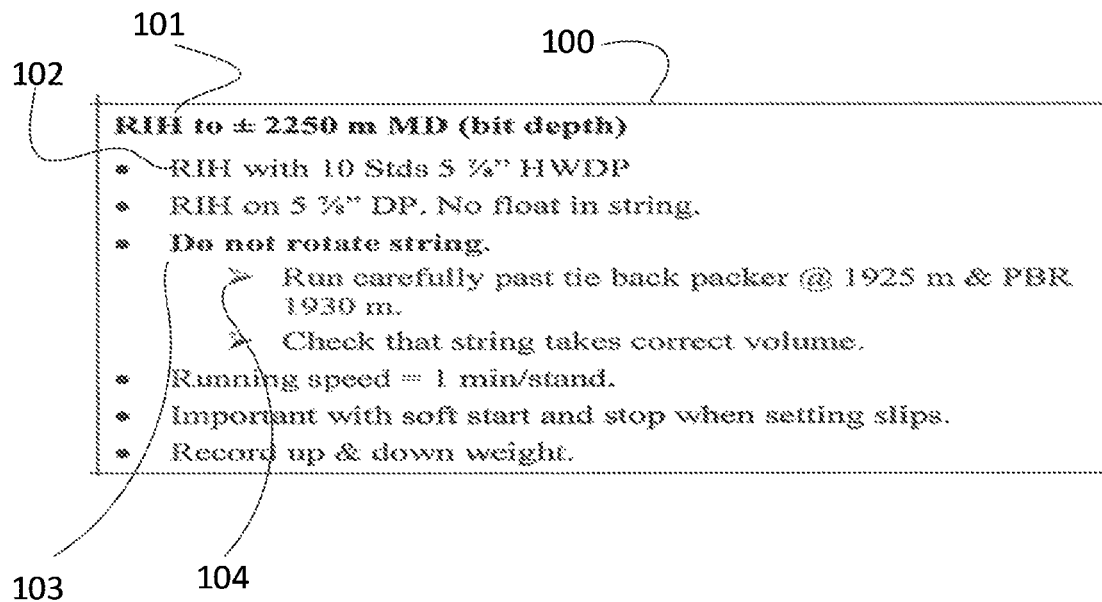
FIG. 1 illustrates an example of a written work procedure showing current representation of main Functions and functions.

FIG. 1 show an excerpt from a well procedure 100 as commonly used in the oil and gas industry which may be considered a typical example for a well procedure. The well procedures provide written instructions to the professionals in charge of the operation. The well procedure shows the planned activities in a sequence of order. The specific well procedure 100 as shown in FIG. 1 has grouped the written instructions under a heading 101. The heading 101 belong in the category "main function" as used in the described method, in this case RIH (run in hole), and written instruction corresponds to the term "function". In this case, for example, instruction 102 belongs in the category of functions in the present invention, whereas instructions 103 and 104 belong in the category "function control" in the proposed method. The instruction 102, "RIH with 10 Stds 5⅞" HWDP", describes what to do, i.e., run 10 lengths of HWDP (Heavy Weight Drill Pipe) into the well, whereas "Do not rotate string." 103 and "Run carefully past tie back packer@ 1925 m & PBR 1930 m." 104 provide instructions and limitations for the activities described in instruction 102. Instructions of the type of 103 and 104 are termed as "function controls" in this disclosure.

Instruction 104 as an example, illustrates a common problem with such well procedures, i.e., the term "Run carefully" is a subjective term that may be interpreted in many different ways, thus resulting in different outcomes based on the interpretation made by the person in charge of the operation. Tasks such as running pipes into the well are very time consuming and monotonous. In the case of running pipes into the well, each pipe section connected to the string is typically 30 m in length, and the string running to the depth of 1925 m as referenced in instruction 104 typically will require around 70 identical operations of connecting a new section of pipe and running it into the well. The function control specified in instruction 104 requires the person in charge of the operation to perform the $71^{st}$ operation differently than the previous 70 operations. There are numerous examples of possible human errors that may occur as with this specific repetitive operation. Each such occurrence potentially costs, including in terms of lost time, and cost, often in the excess of 1 mill USD for offshore wells.

Function controls as exemplified in 103 and 104 may or may not be a part of the typical written well procedures of the type used to date.

Figure 2A:
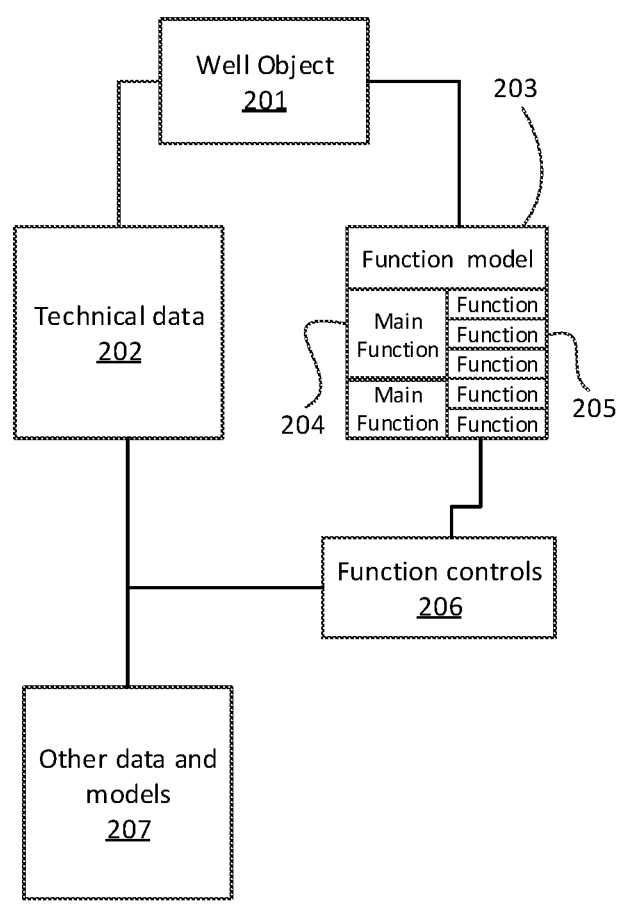
FIG. 2a illustrates an embodiment of the method according to the present invention for digitalizing information in a procedure by tying the activities to the tools.

FIG. 2a illustrates the present invention in its generic form by way of a simplified flow-chart. A well object 201 has an associated technical data 202, and a function model 203. Said function model 203 is sometimes referred as functions data. Said function model comprises main functions, e.g. 204, and functions, e.g., 205 related to a specific main function. For example, function 205 is one of the functions under a main function 204. The technical data 202 describe parameters including, the physical properties and performance limitations of the well object 201, whereas the functions, e.g. 205, describe the well operations required to operate or manipulate said well object 201. A well object may have any number of associated functions, said number being an integer number, from "0" and onwards. In another embodiment of the present invention, said functions preferably performed within a pre-determined performance window, or a safe operating window, at least partially defined by the technical data of the well object 201. In another embodiment, said safe operating window is defined by using the technical data from a plurality of well objects within a well or well environment. In yet another embodiment, other data and models, e.g. 207, are also used for defining said pre-determined performance, or said pre-determined safe operating windows. Examples of said other data and models 207 will be provided in the following figures illustrating some specific well objects. As the person skilled in the art will appreciate, the well object 201 may also be a piece of equipment, a tool or other device, for example, used to operate in said well environment. An example of said equipment is BHA. The proposed method can also be applied to other types of objects with similar requirements as solved by the present invention.

Figure 2B:
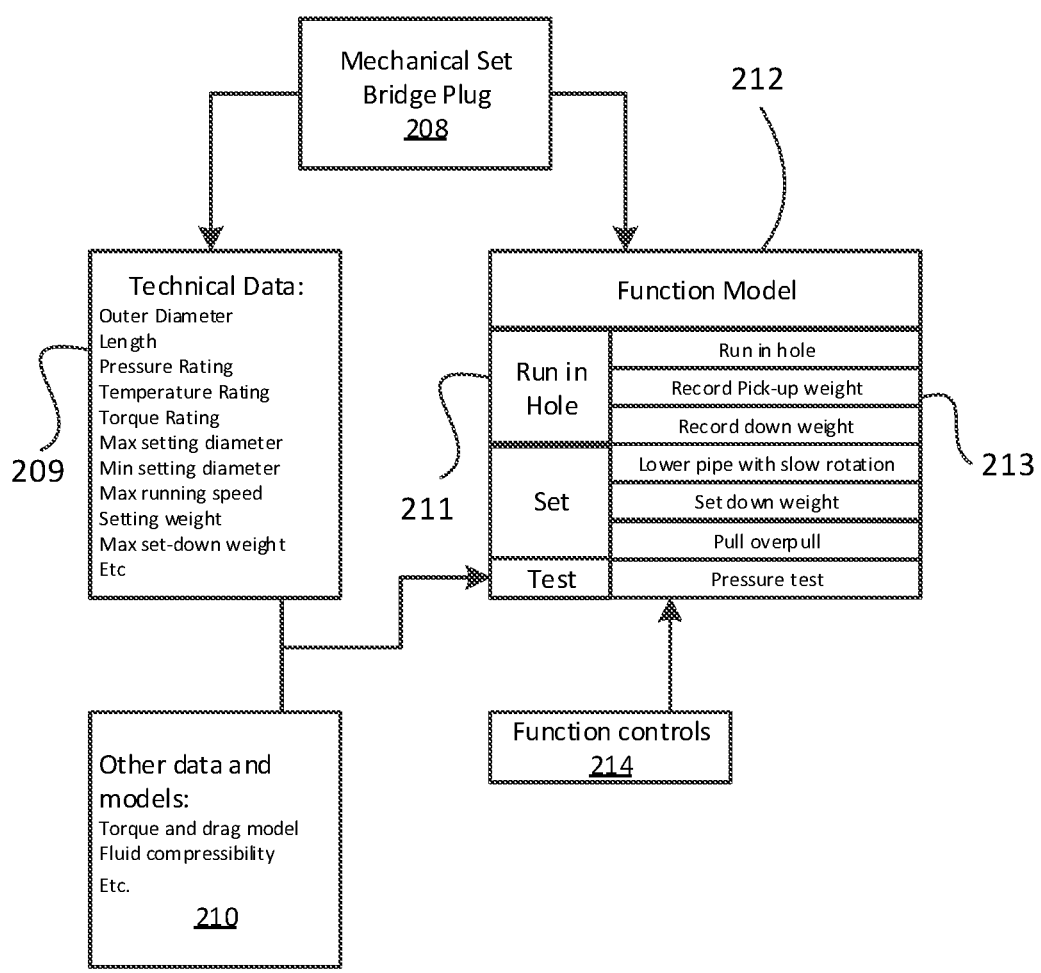
FIG. 2b shows an embodiment exemplifying the application of the method illustrated in FIG. 2 for a specific well object, in this case a mechanical set bridge plug.
Figure 2C:
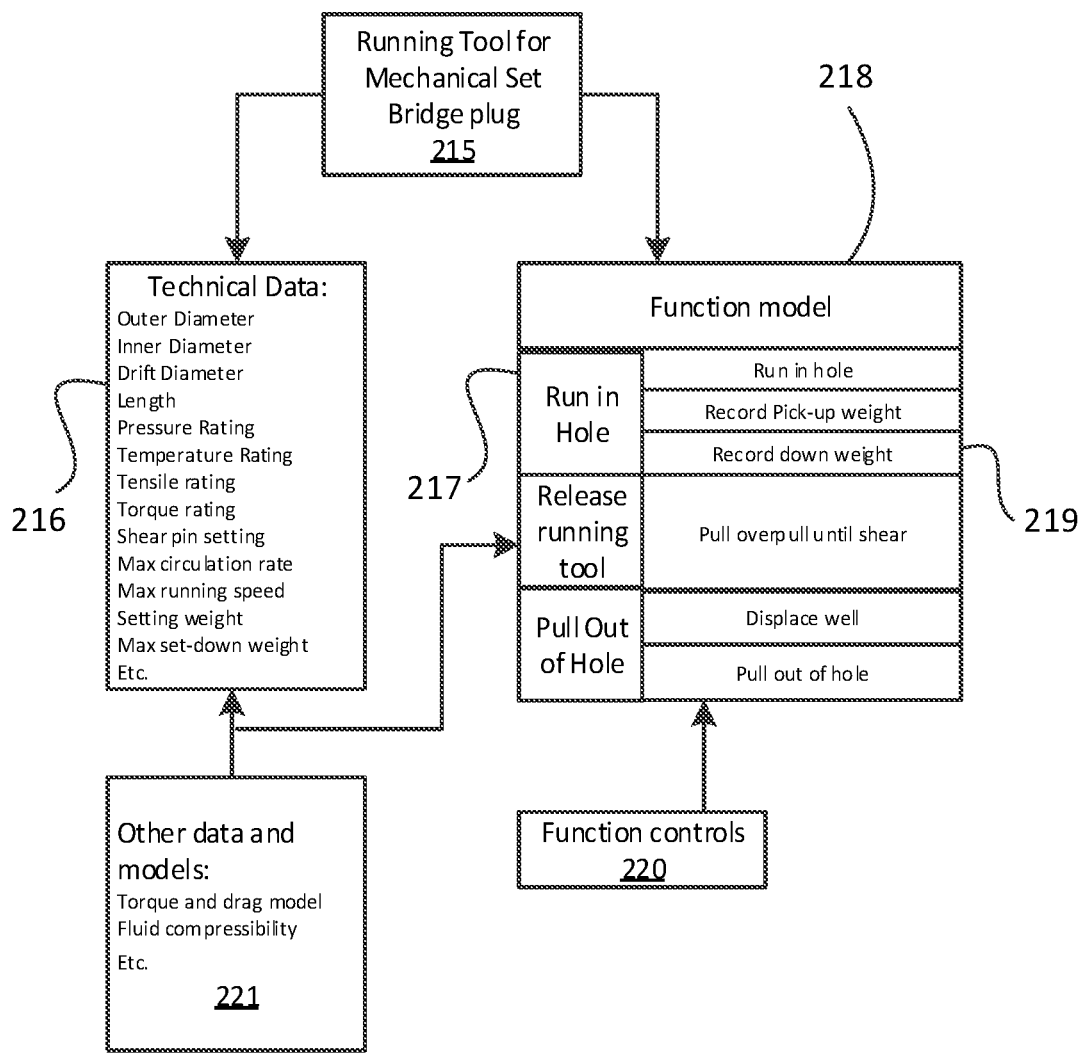
FIG. 2c shows an embodiment exemplifying the application of the method illustrated in FIG. 2 for yet another specific well object, in this case a running tool for mechanical set bridge plug.

FIGS. 2b and 2c exemplify the principles outlined in FIG. 2a by illustrating application to specific well objects. The well objects used an example are, a bridge plug; namely a mechanical set bridge plug 208, and running tool for mechanical set bridge plug 215, for said bridge plug 208. The use of a mechanical set bridge plug, and a running tool for said bridge plug is shown as an example here. A person skilled in the art will appreciate that similar system and method may be applied, at least equally successfully, to other applications also. The invention, for example, may apply to all well objects conveyed in a well or being part of a well.

As a first use case example, FIG. 2b shows a typical subset of applicable technical data objects 209 related to manipulate the specific well object, in this case mechanical set bridge plug 208. A function model 212 comprises main functions, e.g., 211, and their respective functions, e.g., 213 associated the specific main function 211. The object definition may further comprise other data and models 210 that are applicable for the main functions routinely used in well planning. Such data and models may include torque and drag calculations used for calculating loads on individual well objects while moving pipe in the vertical direction, and fluid compressibility factors applicable for calculating the fluid volumes required to reach a certain pressure in the well. The function controls referred in FIG. 1 as 103 and 104 correspond to function controls shown here as 214. The arrows between the blocks in the FIG. 2b are shown related to a given situation during operation, for example, when main function "Test" is running, it will use at least some of the technical data 209 and "Other data and models" 210, and the function "Pressure test" under the main function "Test" will use the controls relevant for the function "Pressure test" from the function controls 214 block. Similar reasoning applies to the arrows in FIG. 2c.

In the second use case example shown in FIG. 2c, another set of technical data 216 is shown that applies to the respective object 215. A related function model 218 includes main functions, e.g. 217, and associated functions, e.g., 219. Associated "other data and models" 221, and related function controls 220 are also shown. In another embodiment of the present invention, the modules including technical data (209, 216), are the same module for different operations, and the system is able to pick a subset of relevant technical data for a specific function. Similarly, functions data (212, 218) may be included in a common module. Furthermore, other data and models (210, 221) may also be included in yet another common module; with the system being capable of sorting and addressing the relevant data, functions or any sub-functions according to the applicable main function.

Now referring again to FIG. 1, each instruction in the well procedure typically involves one or more active manipulations to be performed by the operator. For example, in case of the instruction 102, "RIH with 10 Stds 5⅞" HWDP" the operator of the conveyance unit is required to connect a unit of pipe to the string, and running it into the well, same process being repeated 10 times. The manipulations made by the operator influence the readings of sensors.

Figure 3A:
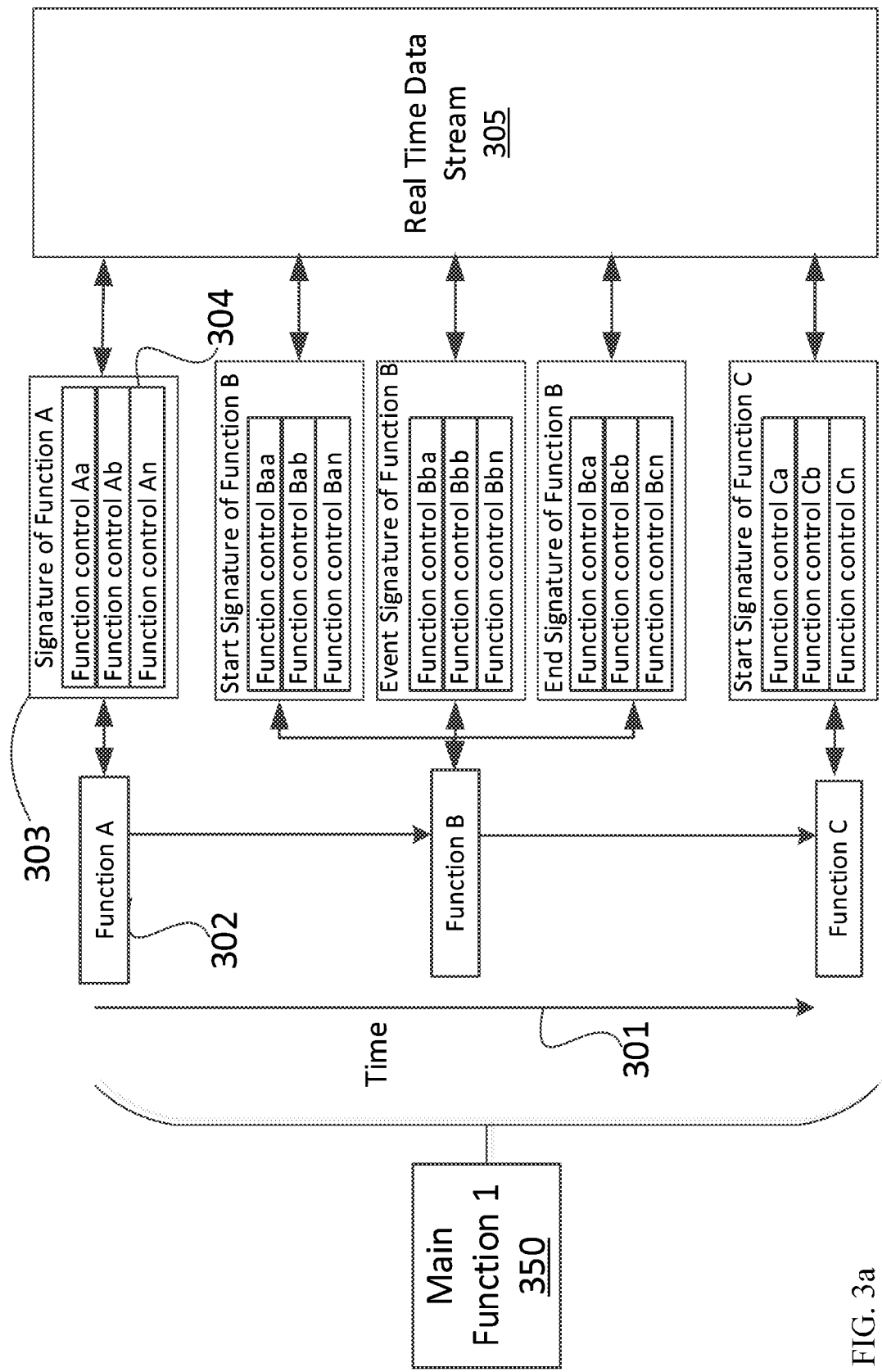
FIG. 3a shows an embodiment of the term signature, and event signatures.

Now referring to FIG. 3a, the shown Real Time Data Stream 305 is comprised of time varying outputs of various sensors in the well system. The sensor outputs reflected in the Real Time Data Stream 305 may be from the control system of the conveyance unit operating the well objects in the well, or an associated real time system gathering data from the conveyance unit, or other associated systems, such as downhole or other sensors installed in association with the well and or the BHA. Said Real Time Data Stream may also include, Remote Operated Vessels (ROVs) or other units associated with the conveyance unit.

FIG. 3a shows in principle, an embodiment of the relationship or operational connections between a main function 350 that comprises functions, e.g. 302, and the Real Time Data Stream 305. The sensor data comprised in 305 further represents the measurable results of the manipulations performed to execute a function. The value of the measured parameters comprised within said Real Time Data Stream 305 will be a function of time 301. By coupling the function controls as proposed in the invention with the measured parameter values, the function controls, e.g. 304, can be used, in another embodiment of the present invention, to provide the boundaries for the acceptable values of the real-time parameters.

Now another preferred embodiment of the present invention will be explained using Function A 302 and associated function controls, e.g., 304, as an example. A subset of the function controls, for example, 304, are included to comprise a unique characteristic signature 303 for the associated function 302.

The function 302 may have one or more signatures. By using the signatures, the present invention proposes the recognition of the individual manipulations, and thus provide information of which specific events that have been executed in the well. By combining the function control parameters such as 304 with the corresponding set of real-time parameters from real time data stream 305, for any given signature, the invention is able to categorize a manipulation, for example, as "successful" or "non-successful", and in either case notify an operator of the outcome of the event. For a signature of a given function, by monitoring the real-time data stream 305 and detecting pre-determined conditions for pre-defined parameters within said stream 305, the present invention proposes issuing of a signature event. Said signature event is then further used to determine the state of the given function, or for determining the state of an operation with said hydrocarbon exploration and recovery environment.

Figure 3B:
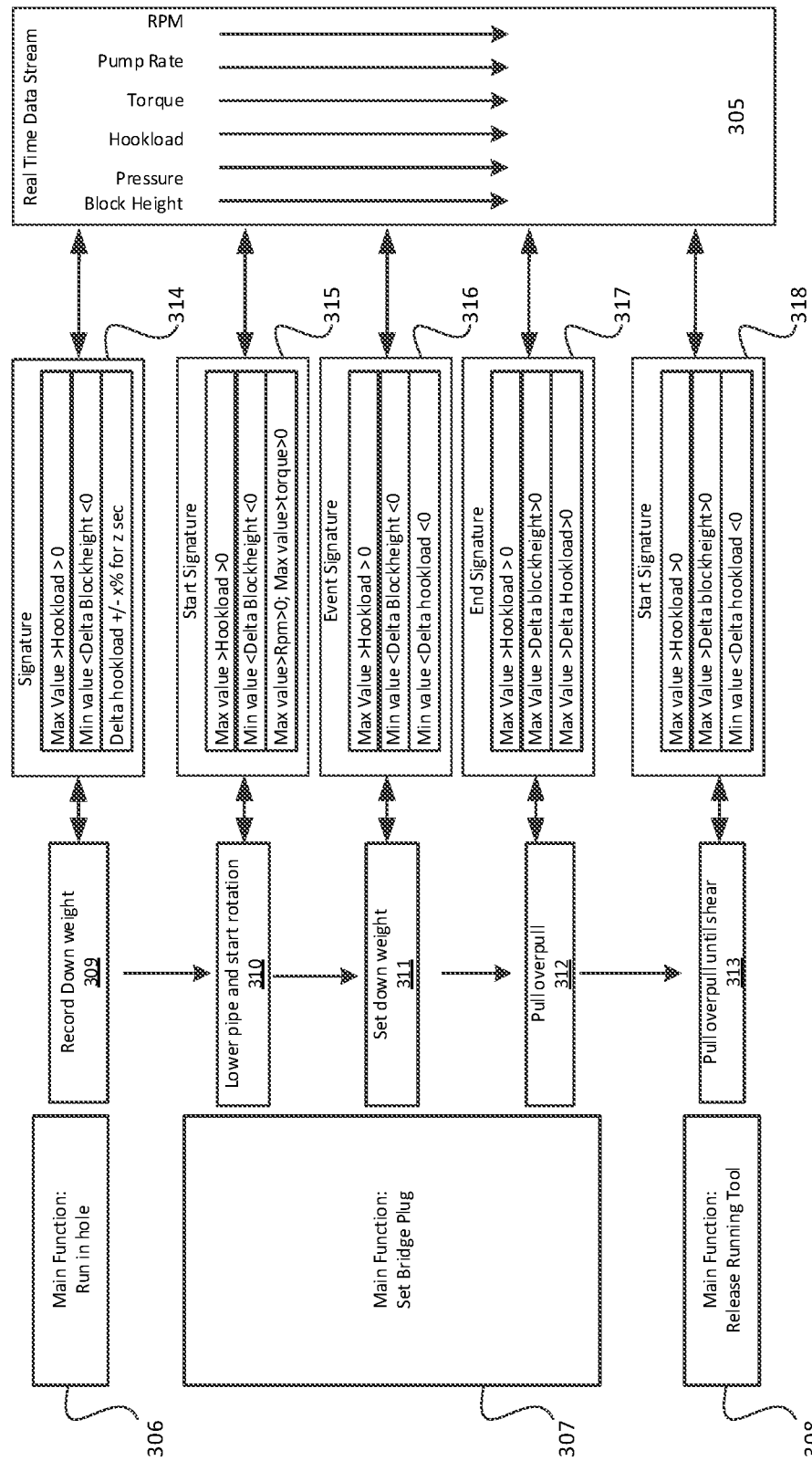
FIG. 3b illustrates an embodiment exemplifying the use of event signatures for some specific functions, and function controls for functions attributed to a well object.

The sub division and segregation of main functions, e.g. 350, and sequential functions or sub-functions, e.g. 302, and signature events, e.g. 303, as shown in the previous example is further explained considering the use cases of a mechanical set bridge plug, and mechanical set bridge plug running tool, as shown in FIG. 3b. Here, 306, 307, and 308 are different main functions that are meant to be performed in a certain sequence from top of the figure towards the bottom. In FIG. 3, only the end signature 314, the one for the function "record down weight" 309 is shown for the first main function "run in hole" 306 in the figure. However, a plurality of signatures, 315, 316 and 317 are shown, related to the second main function "set bridge plug" 307, for demonstrating the sequential nature of the signatures. In this example, the signatures 315, 316 and 317 are associated with their respective functions 310, 311 and 312, and said functions are further related to the second main function 307. Hence, upon initiation of "Set bridge plug" operation associated with the second main function 307, a first function 310, "lower pipe and start rotation", is the first to be initiated. Once function control events monitored within the start signature module 315 are detected according to a given pre-determined sequence, the start signature module informs that a given function has initiated or started by issuing a signature event. Said signature event may either be issued as an electrical signal, or a computational event, such as a flag or an interrupt. In the case of start signature 315, the real-time data stream 305 is monitored to detect the occurrence of certain events by monitoring pre-determined parameters from the Real time Data Stream 305. In this case, the parameters involved in the function controls of the start signature 315, hookload, blockheight and rotation (RPM) 315 are extracted from said real-time data stream 305. Most of these parameters are readily accessible and the names of these parameters and their definition are given in the WITSML standard and are familiar terms for all drilling and well professionals. The parameters may also be derived or calculated from, or found on the basis of primary parameters or elements in the BHA model or well model. Examples of derived and calculated values include, measured depth, true vertical depth or combined loads on a well object, such as the combination of torque and tensile while rotating. Deriving and calculating such parameters can be performed using existing methods and models. The term well model in a simple sense may refer to an existing model for the site where said hydrocarbon recovery or exploration operations are to be performed. Said well model typically comprises geological parameters, fluid related parameters, pressure, drag, force, hardness values and such. When the site is manipulated, for example, by exploration or recovery operations, which typically also involve construction and installation, the well model is updated to include said manipulations. The manipulations may include riser, casing, liner, mud, BOP and such. The model can be updated for example, by including or updating definitions, values, models and parameters for said manipulations.

By detecting another signature or a set of signatures, e.g., an event signature 316, the main function detects that a given event according to a subsequent function 311 is in progress. Similarly, by detecting yet another signature, or a set of signatures, e.g., an end signature 317, the main function detects that a given event according to further a subsequent function 312 has occurred. The end signature, e.g. 317, marks the end of the corresponding main event 307.

The Down weight as shown e.g., in 314 is, in FIG. 3b, the measured of the weight of the drill string (hookload) while running in hole. It is a commonly used term and is the actual weight of the drill string subtracting the buoyancy and drag forces experienced in the well. Its expected value can be calculated, for example, by a torque and drag program. As an example, the signature of the "record down weight" function 309 comprises conditions, a) that the hookload is larger than 0 (indicating here that the weight of the drillstring is suspended in the hook), b) The block (i.e., drilling machine) is moving downwards (i.e., Delta Blockheight<0), and, c) the hookload readings are stable, thus establishing down weight as a parameter. In addition to the shown parameters constituting the signature, additional function controls may apply. These, for example, include function controls controlling depth, torque, rpm, pressure and/or other parameters included in or derived from the real time data stream. The values such as "Max Value", "Min Value", "x" and "z" as shown in 314 can be defined from the technical data 209, 216 and other data and models 210, 221. As the functions 309, 310, 311, 312 and 313 are sequential in nature, the signature for "Lower pipe and start rotation" 310 will not apply before the "Record Downweight" 309 function has been completed. The signature 315 for function "Lower pipe and start rotation" 310 is unique only in the context of well, sequence and in this case, the main function 307, it is relevant under. The same signature may uniquely define another function in another context of well, sequence, and main function. For functions "Lower pipe and start rotation" 310, "Set down weight" 311 and "Pull overpull" 312, their corresponding signatures 315, 316 and 317 provide the necessary and required functions and signatures for acceptance in the Main Function "Set Bridge Plug" 307.

The method according to the present invention, therefore, provides an automated decision support, not only in qualifying the manipulations of the conveyance unit by its operator as successful or non-successful, but also providing data on the acceptable parameter readings for each manipulation. Now referring again to FIG. 1, using the instruction 104 as an example, the signature for "run carefully past tie back packer@ 1925 m & PBR 1930 m" may also be used to issue warnings to the operator prior to the occurrence of an event. In this case, a warning can be given to "run carefully at the function control depth=1920 m".

Figure 4A:
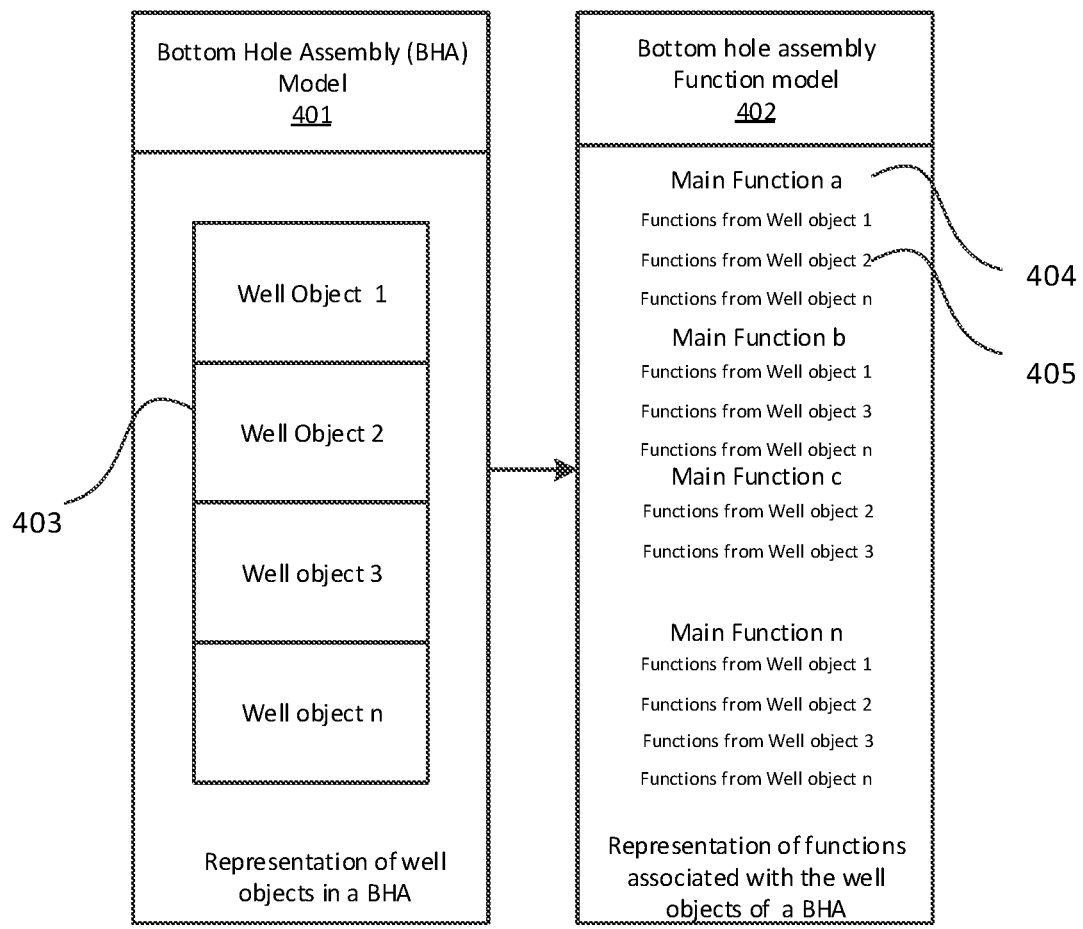
FIG. 4a illustrates an embodiment of the method according to the present invention exemplifying the application of the invention for developing a Bottom Hole Assembly (BHA) Model and generating a Function Model for the BHA in a general sense.

FIG. 4a illustrates yet another embodiment of the present invention for planning well operations. In order to perform an operation in a well, generally a number of selected well objects, e.g. 403, are assembled with the purpose of performing one or more operations in the well. Now taking a specific example of BHA; in the planning phase of the operation, these selected well objects are coupled to build a Bottom Hole Assembly (BHA) Model 401. This is a commonly known term and assembling a BHA is a common practice known to all drilling and well professionals.

According to the present invention, each of the well objects, e.g. 403, included in the BHA Model 410, comprises attributed technical data e.g., 202 (not shown here), so that the BHA Model comprises the combined technical data for all of the well objects included in the BHA model. In another embodiment of this invention, a BHA Function Model 402 is automatically generated based on the functions 205 and Main Functions 203 that were defined as attributes to the well objects that are a part of the BHA model. For generating the BHA Function Model 402, the functions, e.g. 405, associated with each well object, e.g. 403, are instantiated and sorted under the respective main functions, e.g. 404, and listed as attributes of each well object constituting the BHA Model. The order of the functions generated from each of the well objects part of the BHA model within each main function may or be created manually or by automatically creating a sequential order of functions. The arrow between the blocks 401 and 402 signifies automatic generation of the BHA function model, based upon creating of the BHA model 401.

Figure 4B:
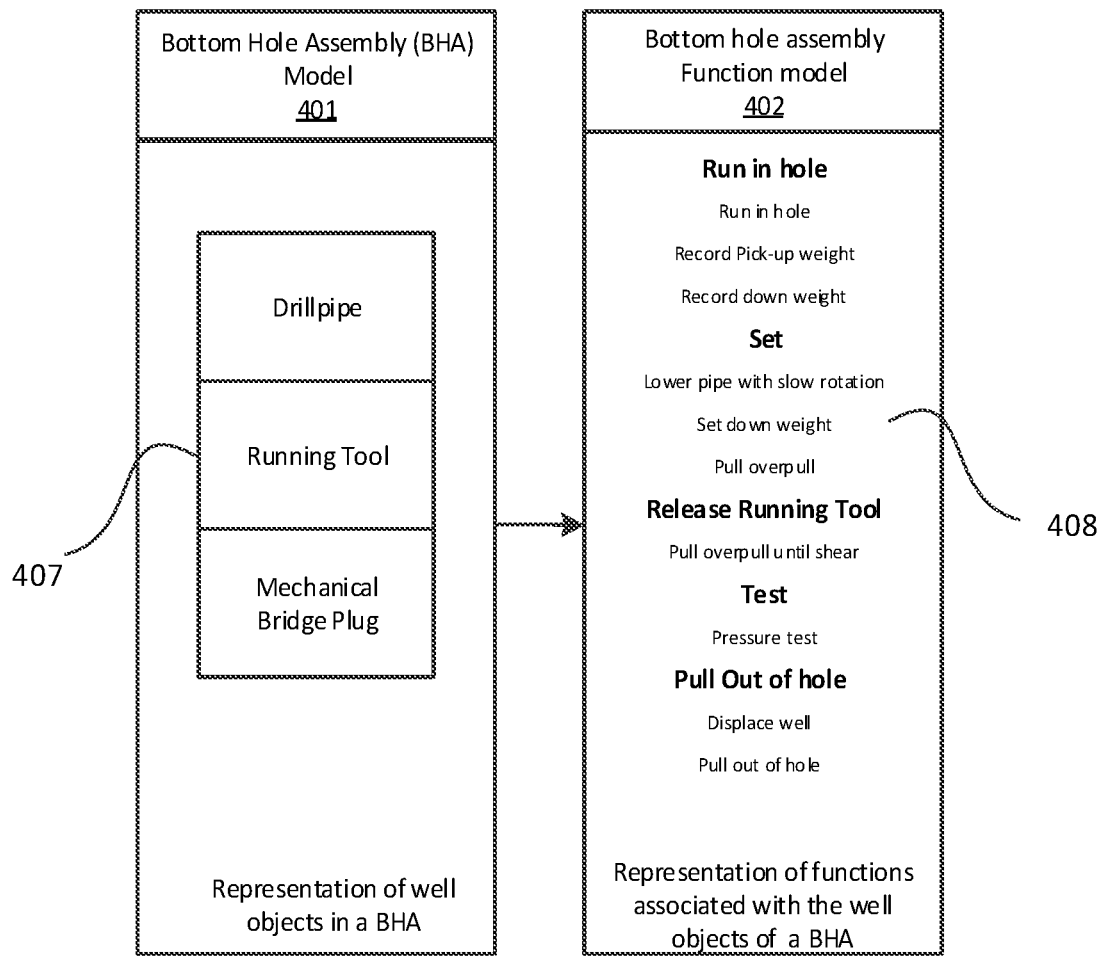
FIG. 4b shows a specific example of the application of the method illustrated in FIG. 4a, by using specific well objects. In this case using some of the well objects exemplified in FIG. 2b and FIG. 2c.

FIG. 4b clarifies the discussion of FIG. 4a by showing a specific combination of well objects in the BHA Model 401, using some of the same well objects as were used in FIG. 2b, FIGS. 2c and 3b. The BHA Model 401 comprises a number of well objects, for example Running Tool 407. Said BHA Model 401 also includes technical data 209, 216, and function attributes 213, 219 (not shown in FIG. 4b). The function attributes are sorted giving a BHA function model 402, representing a set of main functions and functions 408 in a sequential order. The functions have associated function controls 214, 220, which provide the link to the Real Time Data Stream 305 as shown, e.g., in FIG. 3b.

Figure 5A:
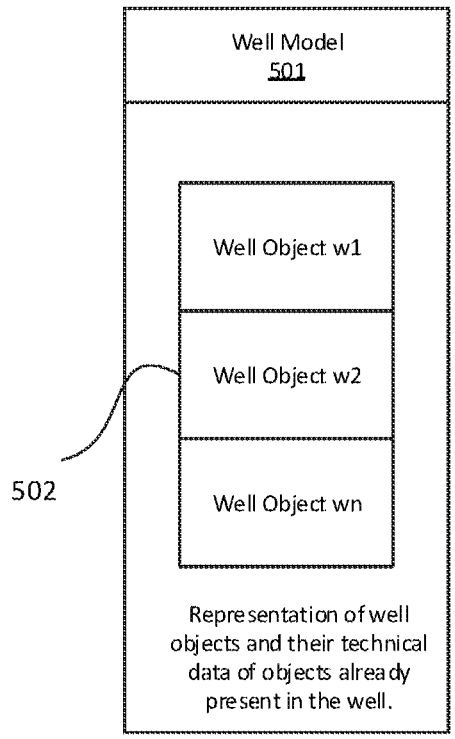
FIG. 5 illustrates an embodiment of a concept for a well model in a general sense and an embodiment of a well model further exemplified using some specific well objects.
Figure 5B:
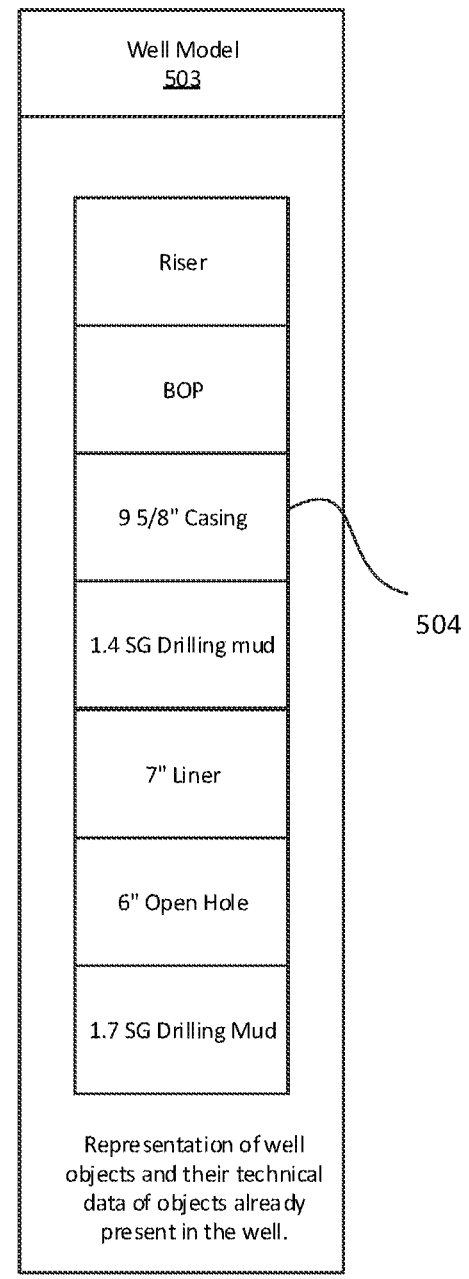

Now referring to FIG. 5, in similar fashion, as for BHA, by combining well objects, e.g. 502, a well model 501 can also be developed. The well model 501 can be built by manual input in a computerized user interface, or automatically by updating the well model 501 as result of a completed function in the well operation phase. In the context of the invention, the hole itself is considered to comprise of one or more well objects, with one or more technical data attributed to each of the well object(s). The first block 501 illustrates a well model in its general sense, whereas the second block 502 on the right hand side shows a specific example of well objects (e.g., 504) that might be a part of a well model. The model 503 thus shows an example of a well model, comprising well objects, e.g. 9⅝" Casing 504, that can further be combined with the BHA Model as shown in FIG. 4b.

Figure 6A:
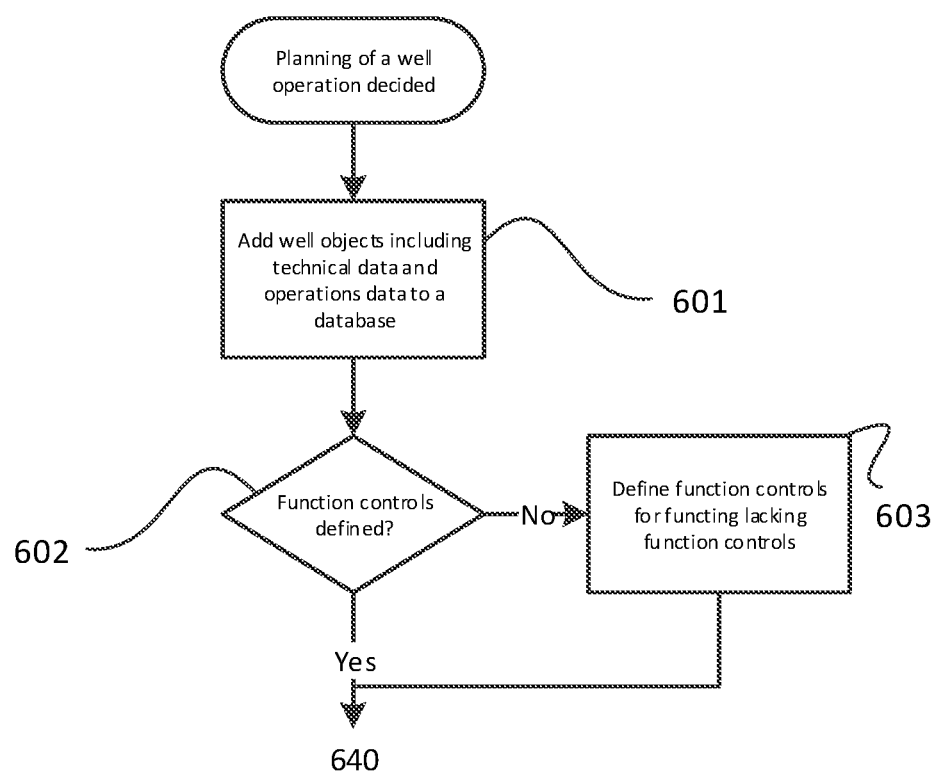
FIGS. 6a, 6b and 6c
illustrate embodiments showing a method for well object configuration, Well Planning, Quality Assurance and Decision Support according to the present invention.
Figure 6B:
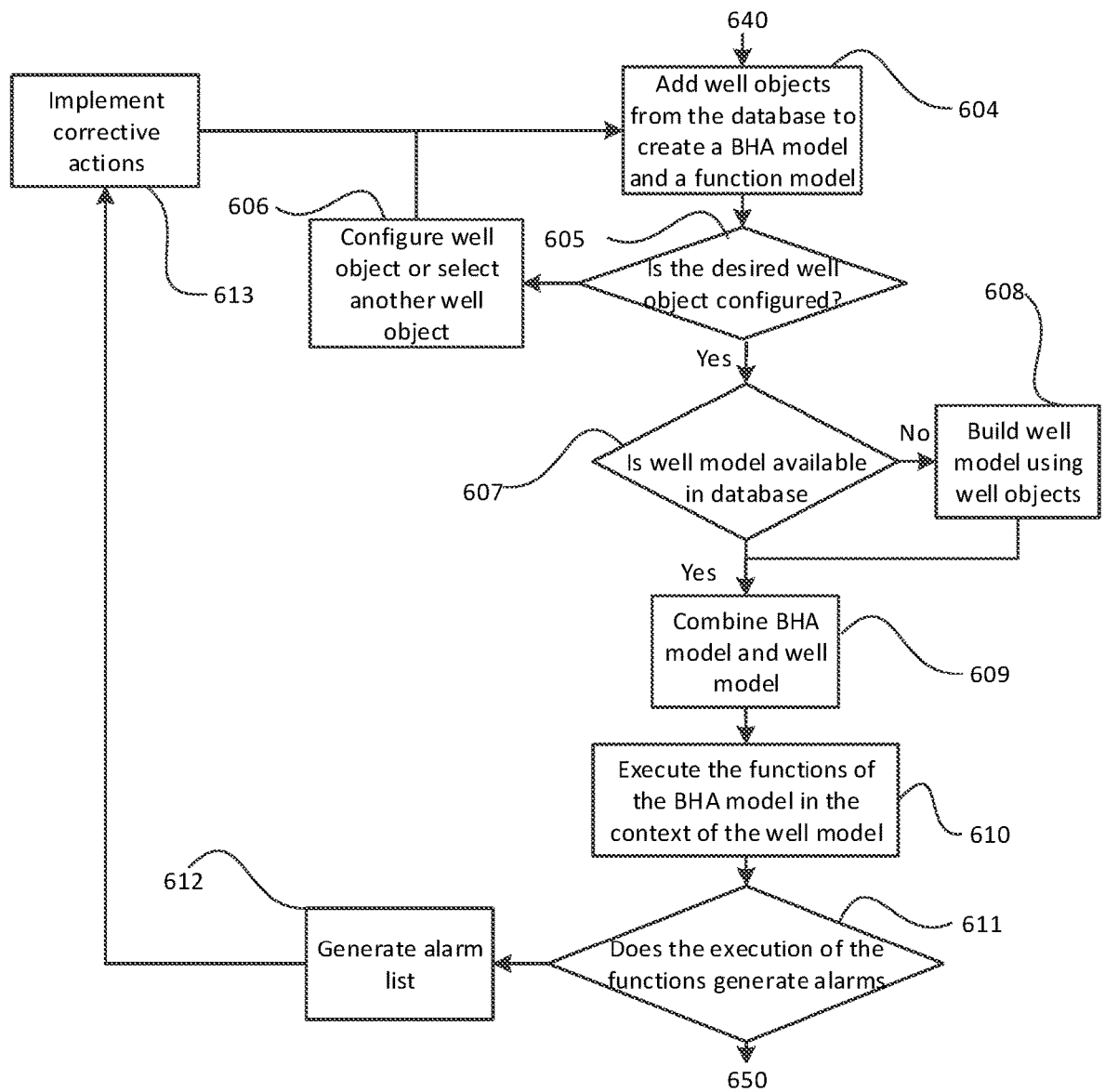
Figure 6C:
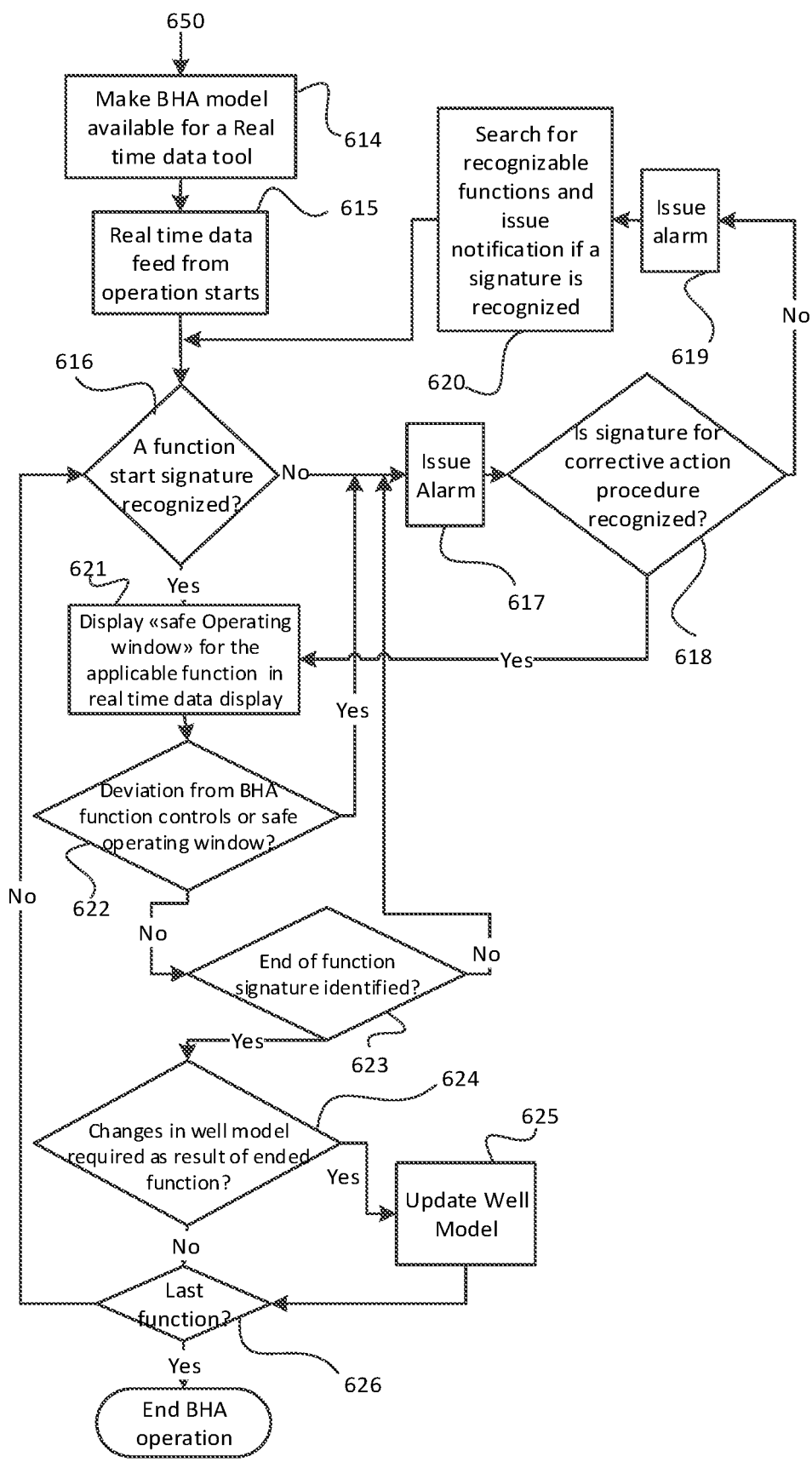

FIGS. 6a, 6b 6c show embodiments of the present invention for achieving automated decision support, taking an example of use case for well operations. More specifically, FIG. 6a-6c will show application towards building and operating a BHA model. A person skilled in the art will understand that same method may be applied to build other models as well. FIG. 6a shows an embodiment for configuring well objects 201 with technical data 202 and function data 203. To start the planning of a process operation, for example, a well operation, attributes including well objects, technical data, functions and operations data are added to and stored in a database 601. Said attributes may alternatively be stored in different databases. Subsequently, in 602, the functions are checked for their existing corresponding function controls 206 in the database or said different databases. In case no such mapping of function controls corresponding to added well objects can be found, additional function controls are added as shown in 603 to ensure that all functions have corresponding function controls such that any given well object has respective attributes added in conformance with FIG. 2. Said additional functional controls are either manually added by the operator, or fetched from another well environment that uses similar well object for which the function controls are needed. Said fetching may for example be done through a communications unit, either wired or wireless.

FIG. 6b illustrates an embodiment of a method using, as an example, building of a BHA model 401 and a BHA function model 402, which may be stored as a generic model or, may be combined at least partially with a well model 501. A well model may or may not exist in advance. When function controls are defined 640, the first step 604 is to combine a plurality of well objects to form a BHA model. A check is then performed 605 to verify that all required well objects are existing and configured in the database. If not, the missing well object must be configured or alternatively another well object must be selected 606 prior to adding additional objects until the BHA model as in 604 is complete. If another well object is defined, a check for required function controls 602 is rerun (not shown in FIG. 6b). When the BHA model is complete, the presence of the relevant well model checked 607 in the database or said different databases, if said well model does not exist in the databases, said well model is built 608 using a plurality of well objects. Said plurality of well objects may at least partially be the well objects added in 601. By combining (in 609) the BHA model (e.g., 401, not shown in FIG. 6b), BHA function model (e.g., 402, not shown in FIG. 6b) with the well model (e.g., 501, not shown in FIG. 6b), a simulated execution of the BHA function model can be executed as shown in 610. Here a computer model executes the function(s) associated with the BHA model in sequence, checking and verifying the function controls associated with any given function against the technical data attributed to the well object(s) that are included in the well model and the BHA model, for the specific function being executed. In case the function controls in any way compromise or violate the operational boundary outlined by the technical parameters of the BHA model and the well model, such violations 611 are logged against the built BHA model and pointing to the specific well object for which the violations were detected, as risks and/or deviations. An alarm list 612 is created, enabling the user or operator to decide if any corrective actions should be performed 613. Such actions as in 613 may further be used, for example, for optimizing the BHA model of 604, creating a new BHA model in the future, or as a part of planning.

An important advantage of doing this is that the user or operator is able to find out very early on if the selected well objects can be used for a given operation without one or more of said selected well objects being damaged or exposed to conditions outside their respective specifications. The proposed trial run comprising 610, 611 and 612 is able to inform the operator about the probability of one or more well objects failing during a given operation such that the operator can select another well object that better suits the given operation. As an example, if a pipe section with given wall thickness was selected as a well object, and during the trial run, the operator finds out that said pipe section will not sustain (e.g., said pipe section will probably get damaged, or experience parameters outside the rated specifications) a given operation, the operator can remove said pipe section from the selected well objects and choose another pipe section which will endure the given operation. Since choosing another pipe section will alter parameters for other well objects, it may prove that yet another well object may be affected by said replaced pipe section. The process of replacing well objects is iterative in nature and very hard to track especially if a large number of well objects are involved. The present embodiment of the invention therefore helps in gaining a high degree of confidence that the well objects that have passed the trial run will result in a successful operation—thereby saving appreciable costs, valuable time, and enhancing safety of operations.

FIG. 6c further illustrates an embodiment of the present invention after the trial execution of the functions. More specifically, the present embodiment focusses on the operation aspect of the method. After said trial execution or run is successful 650, to initiate operation, the BHA model including relevant technical data, functions and function controls are made available 614 for the real time data system, for example, using well known methods, including routinely used file download, or as a real time service connected to the Real Time Data Stream 305 (not shown in FIG. 6c). When the real-time data stream 305 is available, for example, from the real-time data system, these data are compared 616 with the start signature of the first function, to detect the start of the first function for the operation of the BHA model. If the first signature fails to be recognized, a deviation loop is initiated and an alarm event is initiated 617. The model then checks for an alternative signature 618 for a functional model containing corrective actions. If no such signatures can be found, another alarm event is issued 619. At this point, the function model may continue to search for other recognizable signatures 620 that may be used to assess the present operational state of the system. If no signature is recognized, a function not recognized event is issued (not shown in FIG. 6c).

When a signature is recognized, the well function model will configure a safe operating window 621, defined by the operational limits specified, for example, in the function controls for the well objects included in the BHA model, or the well model.

If the boundary values of the function controls defining the safe operating window are violated 622, the deviation loop comprising actions 617, 618, 619, 620 will be initiated, said loop has been described above. If no deviation or violation is detected, the function model will continue to recognize events until the end of function event 623 is recognized or identified. When the end of function signature is recognized, a check of the BHA model, the function model, their associated technical data, and functional control 624 is be performed to identify conditions including, whether any well objects are left and/or retrieved, have changed position in the well, for example, as a result of the execution of the function. If any such conditions are identified, the well model is updated 625. Then, a further check 626 is performed to identify whether the function was the last function in the function model. If this is not the case, the subsequent function is started by checking for its start signature (loop goes back to 616 for the subsequent function), thus repeating the process until the last function is recognized. If the executed function was the last function, the operation of the function model is considered completed, and the next function model associated with the BHA model, or another model, for example, another BHA model may then be initiated.

Figure 7:
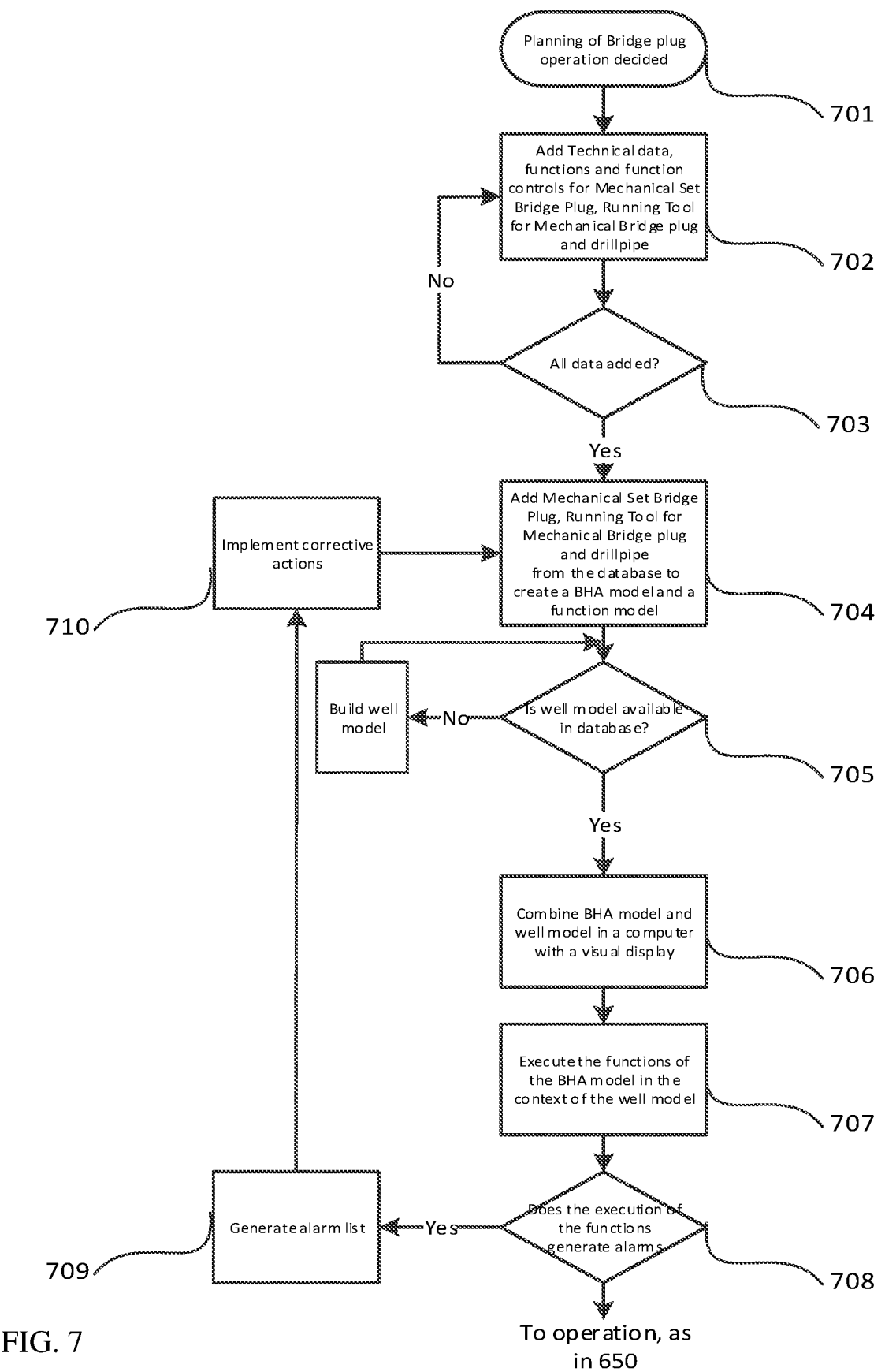
FIG. 7 shows yet another embodiment as an example of how the method shown in FIG. 6 can be applied, using some of the well objects used in FIGS. 2b, 2c, 3b, 4b and 5 as examples.

FIG. 7 further shows an example of the present invention by considering a use case of the Mechanical Set Bridge and the Running Tool for Mechanical Set Bridge Plug. After the planning of an operation, in this case a bridge plug operation 701, technical data and functions of the well objects are entered 702. An example of function controls for each of the functions associated with the well objects has been illustrated in FIG. 3b.

After adding the configuration data, a check is performed for the completeness of the data 703, and then the parameters for the Mechanical Set Bridge and the Running Tool for Mechanical Set Bridge Plug are combined with those of the well object drill pipe to form a BHA Model and a BHA functional Model 704. An example of creating a functional model has been shown in FIG. 4b, where the functions associated with the well objects are sorted according to their associated main functions to form a sequential order of functions, thereby creating a BHA functional model. The sorting of the functions can be computerized, manual or a combination of the two.

Referring again to FIG. 7, thereafter, a check to see if the model for the well in which the BHA shall be run is available in the database is performed 705. If well model is not existing, a well model is either built manually, or as explained previously. For quality assurance purposes, the BHA function model may be combined 706 with a well model, and function controls for each function. These can be simulated in a computer, where the combined technical data from the BHA model and the well model form the basis of the safe operating window for a given function 707. An example of a well model has been shown in FIG. 5. Now referring to FIG. 3b again as an example, using the function "lower pipe and start rotation", the start signature of the function is the combination of Max value>Hookload>0, Min value<Delta Blockheight<0 and Max value>Rpm>0; Max value>torque>0. The boundaries set for these values included in defining the "Safe Operating Window" for the given function. In this step 707, simulated values for RPM, delta block height and calculated values for hookload and torque can be used, using standard and existing torque and drag modelling tools as well as technical data from the well objects in the BHA and Well models as input data to the model. If any of the calculated values exceeds the boundaries set in the signature, an alarm event will be issued and included in a list 709, allowing re-planning 710 to enable operations within the safe operating window. The advantage of this simulated or trial-run has been explained previously.

Upon successful simulated run, the BHA model is ready for operation, for example, as shown in 650 in FIG. 6c.

To summarize, the present invention is a method for controlling method for controlling the state of one or more operations in a process environment, Said process environment is preferably a hydrocarbon exploration and recovery environment. Said method mainly includes the following steps:

Creating at least one function model. Said function model includes at least one function.

Executing at least one function within said function model. Said execution is performed on a computational unit.

Defining a plurality of function controls.

Monitoring the occurrence of said signature event during execution of a certain function included in said at least one function model.

A pre-determined combination of given function controls within said plurality of function controls defines a signature event. When said signature event occurs, a specific state of said operation can be determined.

Said method may also include the following steps:

Creating of at least one database, and

Storing, retrieving, and updating said function model and function controls in said at least one database.

Said at least database is typically stored in a storage unit, such as a hard disk, re-writable optical media, or other types of random access memory. Said database is operatively connected with said computational unit.

Said method may also comprise the following steps:

Monitoring a real-time data stream, said real-time data stream including real-time measured parameters from various locations in said hydrocarbon exploration and recovery environment.

The execution of the function being performed according to a technical dataset or technical data related to said function, said technical data including parameters such as, dimensions, pressure ratings, weights, limits and tolerances; and Issuing an event of interest when a measured parameter in said real-time data stream violates a pre-defined limit or tolerance defined in the technical data or dataset.

Said real-time data stream is typically transmitted using one or more communications units, said communications unit transmitting data for example over a hardwired data bus. Said data may also be at least partially be transmitted wirelessly. The data stream comprises at least partially real-time measurements recorded by various sensors within said environment. Said communications unit may also comprise a bus control unit controlling data over said bus. Said bus may further be operatively connected to at least one control system, said control system controlling at least one operation within said environment. Said control system may further control at least one of said communications units, thereby controlling the data transmitted in said real-time data stream. Said control system may filter or signal condition the measurement data from said various sensors before transmitting said data completely or partially in the real-time data stream. Said control system is either operatively connected to said computational unit, or said control system and computational unit are the same unit.

Said technical dataset is preferably stored in said at least one database. In case of a plurality of databases, said plurality of databases are operatively connected either directly or through at least one control unit. Said control unit may be combined with or operatively connected with said computational unit. At least some of the said plurality of databases could be located on a remote location. Said operative connection between said databases may be through a wired or wireless computer interface or their combination.

Furthermore, said method also involves sending at least one control signal to a physical entity. Said physical entity can be a tool, a machine, or an operatable well. Said control signal is preferably electric, however said control signal can also be pneumatic, hydraulic, their likes or their combination.

In addition to said technical data or dataset, the proposed method may also involve use of other data and models. Said other data and models are related to the parameters and mathematically modeled behavior of said physical entity, geology related parameters, fluid related parameters, parameters of drilling mud or other objects in said environment. Said other data and models can further include, torque, force, strength, fluid compressibility, drag, and other physical parameters. Said other data and models can further include chemical parameters.

Said function model may comprise other function data such as a plurality of functions. Said function model preferably also comprises at least one main function.

Said method preferably uses a plurality of signature events such as start signature, in-progress signature and end signature to determine the state of at least one operation.

Said method may also involve issuing of other signature events, including, at least one of the; a failed function event, and a function failed event.

If a given operation state cannot be determined using the signature events associated or designated functions for said operation, the method proposes looking for signature of other functions.

Said method may further comprise the following steps:

Defining a safe operating window for each of the parameters of interest: Said parameters of interest including measured parameters in said real-time data stream, and calculated parameters, said calculated parameters being derived from the measured parameters in said real-time data stream; and Issuing of an alarm when a parameter of interest violates the safe operating window.

In case a function state not recognized signature event is detected, the method involves looking for a signature event for other functions, or looking for a signature event in a database of signature events for errors, faults and deviations, to be able to determine the state of the operation.

The method preferably also involves the updating of, said at least one database;

the plurality of function controls; and the at least one function model.

The updates are performed for improving the performance of the succeeding operation relative to the last operation performed in said hydrocarbon exploration and recovery environment. Said updates are preferably performed after the end signature event of the last function in the sequence of execution of said at least one function. Said updates may also be performed in real-time or intermittently.

Said method also preferably includes steps for building the at least one function model, and at least one process model. Said process model is, for example, a model of a given set of objects in the environment. Said process model may also be a model of the whole environment. Said steps for building at least one function model and at least one process model include, adding objects, said objects including technical data and operations data to a first database;

defining function controls for functions to be performed in the process environment, or if at least some of said functions already are defined in another database, retrieving the already defined functions;

building a function model from the objects added to the first database;

checking that all required objects have been added to the first database;

building said process model by combining relevant function models;

executing the functions within each function model included in the process model;

checking that the execution of the functions in context of the process model does not generate errors, and in case of any error being detected, either issuing an alarm for an operator, requiring manual input by the operator, or implementing corrective actions automatically by checking previous manual inputs to resolve a similar error.

What is claimed is:

1. A method for planning well operations by automatically generating a function model for the operation of a plurality of well objects in an oil well comprising:

assigning technical parameters of interest to each of the well objects in the oil well;

assigning functions to each well object, wherein the functions comprise operations and actions recommended to operate each of the well objects in the oil well during oil recovery, wherein the operations and actions include at least one of: vertical movement of a pipe, rotation or applied torque to a pipe, pressure of circulation through a pipe, or transmission of signals via a pipe;

combining the functions associated with each of the well objects into a plurality of functional models describing operations to be executed to physically manipulate the plurality of well objects;

defining a safe operating window for each of the functions in the plurality of functional models considering the technical parameters of interest assigned to each of the plurality of well objects;

automatically generating, by a control system, control signals based on the functional model and the safe operating window, wherein the control signals comprise operational commands for physically manipulating the well objects; and physically operating each of the plurality of well objects of the oil well by transmitting the control signals to actuators associated with the well objects to execute operations described by the functional model that are within the safe operating window, wherein the transmitted control signals cause the actuators to physically manipulate the well objects.

2. The method according to claim 1, further comprising: creating at least one database; and storing, retrieving, and updating the function model in the at least one database.

3. The method according to claim 1, wherein the operating of the plurality of well objects in the well comprises sending at least one control signal to at least one of the plurality of well objects.

4. The method of claim 1, where each function is associated with a main function, allowing automated sorting of functions originating from multiple well objects to be placed under the same main function heading.

* * * * *